(12) United States Patent
Tangudu et al.

(10) Patent No.: US 11,757,335 B2
(45) Date of Patent: Sep. 12, 2023

(54) COOLING CHANNELS IN A HIGH-DENSITY MOTOR

(71) Applicant: Hamilton Sundstrand Corporation, Charlotte, NC (US)

(72) Inventors: Jagadeesh Kumar Tangudu, South Windsor, CT (US); Aritra Sur, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 226 days.

(21) Appl. No.: 17/223,443

(22) Filed: Apr. 6, 2021

(65) Prior Publication Data

US 2022/0320961 A1    Oct. 6, 2022

(51) Int. Cl.
| | |
|---|---|
| *H02K 9/19* | (2006.01) |
| *H02K 1/16* | (2006.01) |
| *H02K 3/12* | (2006.01) |
| *H02K 3/48* | (2006.01) |
| *H02K 3/24* | (2006.01) |

(52) U.S. Cl.
CPC ............. *H02K 9/19* (2013.01); *H02K 1/16* (2013.01); *H02K 3/12* (2013.01); *H02K 3/24* (2013.01); *H02K 3/48* (2013.01)

(58) Field of Classification Search
CPC ............ H02K 1/187; H02K 1/20; H02K 3/24; H02K 9/19
See application file for complete search history.

(56) References Cited

U.S. PATENT DOCUMENTS

| | | | |
|---|---|---|---|
| 4,731,554 A | 3/1988 | Hall et al. | |
| 6,936,948 B2 * | 8/2005 | Bell | H02M 7/00 |
| | | | 310/179 |
| 10,038,353 B2 | 7/2018 | Kusase | |
| 2014/0015351 A1 | 1/2014 | Marvin et al. | |
| 2018/0287437 A1 * | 10/2018 | Haran | H02K 3/47 |
| 2020/0161947 A1 | 5/2020 | Silva et al. | |

FOREIGN PATENT DOCUMENTS

| | | |
|---|---|---|
| FR | 3005219 A1 | 10/2014 |
| JP | 2020171096 A | 10/2020 |
| WO | 2008031019 A2 | 3/2008 |

OTHER PUBLICATIONS

Abstract for JP2020171096 (A), Published: Oct. 15, 2020, 1 page.
European Search Report for Application No. 22166821.3, dated Oct. 4, 2022, 9 pages.
Machine Translation for FR3005219 (A1); Published: Oct. 31, 2014, 4 pages.

* cited by examiner

*Primary Examiner* — Quyen P Leung
*Assistant Examiner* — Minki Chang
(74) *Attorney, Agent, or Firm* — CANTOR COLBURN LLP

(57) ABSTRACT

A stator includes a stator hub and a plurality of stator teeth extending from the stator hub that define a stator slot having a stator slot base. At least one winding is disposed in the stator slot and the stator also includes a back iron. The winding surrounds the back iron and is held apart from the stator slot base so that a fluid channel is defined between an inner winding portion of the at least one winding so fluid can be passed between the stator slot base and the inner winding portion to cool the inner winding portion.

13 Claims, 9 Drawing Sheets

COOLING CHANNELS IN A HIGH-DENSITY MOTOR

BACKGROUND OF THE INVENTION

The subject matter disclosed herein relates to electrical machines. More specifically, the subject matter disclosed herein relates to passages for delivering a cooling fluid through a stator of a high-density electric motor A typical liquid cooled electric machines/motors includes a rotor having a core and one or more rotor windings (conductors) extending therethrough. In some machines, permanent magnet machines, the rotor windings are replaced with a plurality of permanent magnets. The rotor is surrounded by a stator and an air gap exists between the rotor and stator.

Similarly, the stator includes a stator core having one or more stator windings extending therethrough. High power density electric machines (either generator or motor) produce intense resistive heating of both the stator and rotor windings and eddy current and magnetic hysteresis heating of the rotor and stator cores.

Typical methods of stator cooling include utilizing an end-turn spray and thermal conduction through the back iron to a cooled housing or fluid media.

For example, traditional motor thermal management is often in the form of external fins or liquid cooling jackets. Such systems typically direct cooling liquid through one or more channels in the back iron (housing) radially outboard of the stator core. These cooling methods, however, provide cooling only on the radial and axial periphery of the stator core. Therefore, a hot spot in the stator windings can occur at the axial centerline of the stator core.

BRIEF DESCRIPTION OF THE INVENTION

Disclosed is stator that includes a stator hub. The stator also includes a plurality of stator teeth extending from the stator hub that define a stator slot having a stator slot base, at least one winding disposed in the stator slot, and a back iron. The winding surrounds the back iron and is held apart from the stator slot base so that a fluid channel is defined between an inner winding portion of the at least one winding so fluid can be passed between the stator slot base and the inner winding portion to cool the inner winding portion.

In addition to one or more of the features described above, or as an alternative to any of the foregoing embodiments, the winding is encased in a potting material.

In addition to one or more of the features described above, or as an alternative to any of the foregoing embodiments, the winding is formed of Litz wire.

In addition to one or more of the features described above, or as an alternative to any of the foregoing embodiments, the at least one winding includes a plurality of windings with each winding including an outer winding portion connected to an inner winding portion by end turns and the stator further includes: one or more winding separators formed of insulating material and disposed between adjacent ones of outer winding portions.

In addition to one or more of the features described above, or as an alternative to any of the foregoing embodiments, the one or more winding separators include cooling passages formed therein.

In addition to one or more of the features described above, or as an alternative to any of the foregoing embodiments, the one or more winding separators include fins formed in the cooling passages thereof In addition to one or more of the features described above, or as an alternative to any of the foregoing embodiments, the stator further comprising insulators disposed between adjacent inner winding portions.

In addition to one or more of the features described above, or as an alternative to any of the foregoing embodiments, the insulators include fins that extend into the coolant channel.

In addition to one or more of the features described above, or as an alternative to any of the foregoing embodiments, the at least one winding includes 3, 5 or 3n windings where n is a whole number.

In addition to one or more of the features described above, or as an alternative to any of the foregoing embodiments, the stator slot includes walls and one or more fins extending from the tooth or the base into the coolant channel.

In addition to one or more of the features described above, or as an alternative to any of the foregoing embodiments, the stator can be in combination with an inlet header and outlet header that collectively provide fluid through the coolant channel.

Also disclosed is a method of cooling a stator of any prior embodiment or that is otherwise disclosed herein. The method can include providing fluid into the coolant channel from inlet header; and removing fluid from the coolant channel via an outlet header.

In addition to one or more of the features described above, or as an alternative to any of the foregoing embodiments, the at least one winding includes a plurality of windings with each winding including an outer winding portion connected to an inner winding portion by end turns and the stator further includes: one or more winding separators formed of insulating material and disposed between adjacent ones of outer winding portions.

In addition to one or more of the features described above, or as an alternative to any of the foregoing embodiments, the one or more winding separators include cooling passages formed therein, the method further comprising: providing fluid into the cooling passages in the winding separators and removing the fluid from the cooling passages in the winding separators by separator cooling inlet and outlet headers.

In addition to one or more of the features described above, or as an alternative to any of the foregoing embodiments, the separator cooling inlet and outlet headers are integrated with the inlet and outlet headers.

In addition to one or more of the features described above, or as an alternative to any of the foregoing embodiments, the at least one winding includes a plurality of windings with each winding including an outer winding portion connected to an inner winding portion by end turns and the stator further includes: one or more winding separators formed of insulating material and disposed between adjacent ones of outer winding portions; wherein the one or more winding separators include cooling passages formed therein; wherein the one or more winding separators includes a first winding separator and a second winding separator connected to one another by a manifold so that fluid entering the first winding separator is directed through the first winding separator in a first direction, through the manifold and into and through the second winding separator in a second direction.

In addition to one or more of the features described above, or as an alternative to any of the foregoing embodiments, the first and second directions are opposite of another.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As motors have become more compact alternative methods of cooling the stator may be beneficial. Herein disclosed is a stator core that can be used to improve cooling. In that core there is provided a flow channel that cools at least one half of a particular winding. Each turn can be separated from an adjacent winding by a separator as well. The separator can be formed of ceramic. In one embodiment, the flow channel is provided with a flow of coolant. If the ceramic separators are present, those separators can also be provided with a flow of coolant but that is not required.

In one embodiment, the flow channel is defined due having the winding being wrapped around a back iron portion of the stator. In each particular stator slot, the windings are wound such that they form multiple (three) bunches (or loops) separated by an insulating layer. Each bunch has a one turn of the coil and is wrapped from in inner to outer diameter of the stator (or vice-versa). The coolant flows through the flow channel directly cooling one half of the winding per slot. The heat generated by the winding section on the OD side gets effective conducted to the ID section of the winding due to very high thermal conductivity. The heat then gets directly dissipated into the coolant. The flow channel may be connected to an inlet and an outlet header to facilitate a flow through design in one embodiment.

Figure 1:
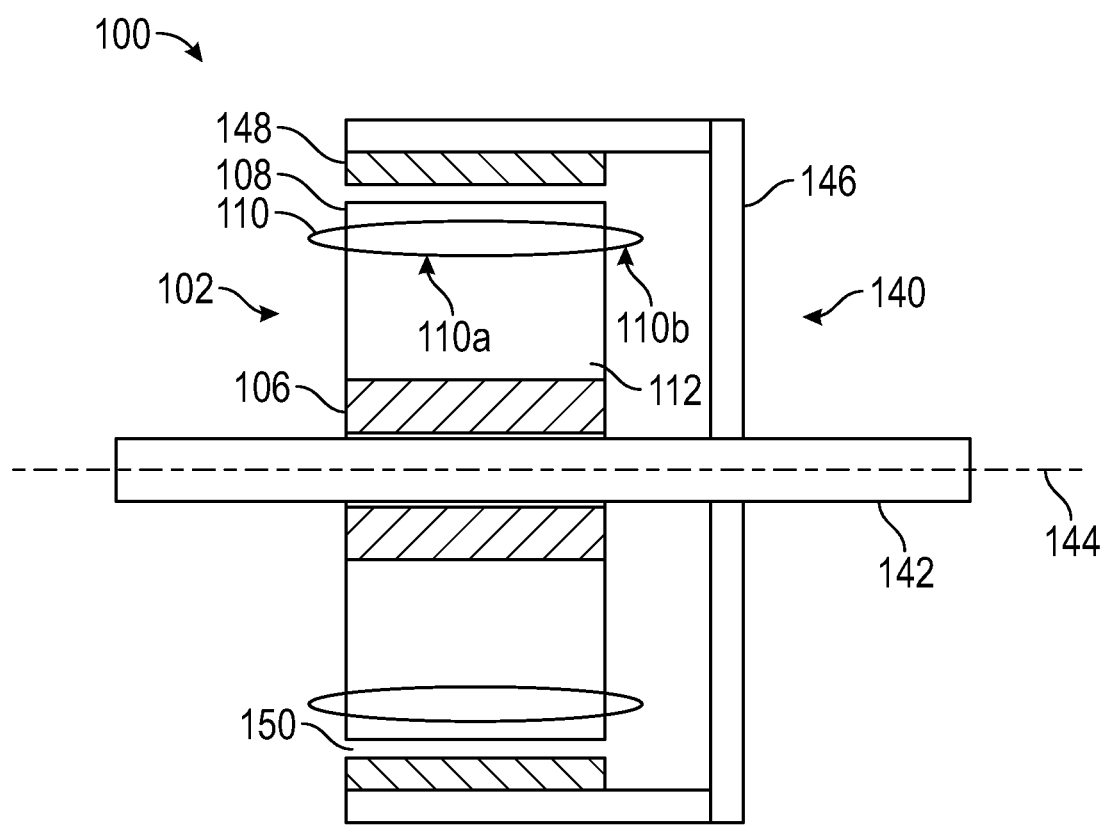
FIG. 1 is a cross-sectional view of an embodiment of an electric machine showing a rotor and a partial view of a stator.

FIG. 1 shows a schematic illustration of a cross section of an electric motor 100 that may incorporate embodiments of the present disclosure are shown. While shown as having rotor magnets external to or outside of the stator, the orientation could be reversed. Further, the teachings herein could be applied to a context where the magnets are u-shaped and surround both inner and outer portions of the stator.

Figure 2:
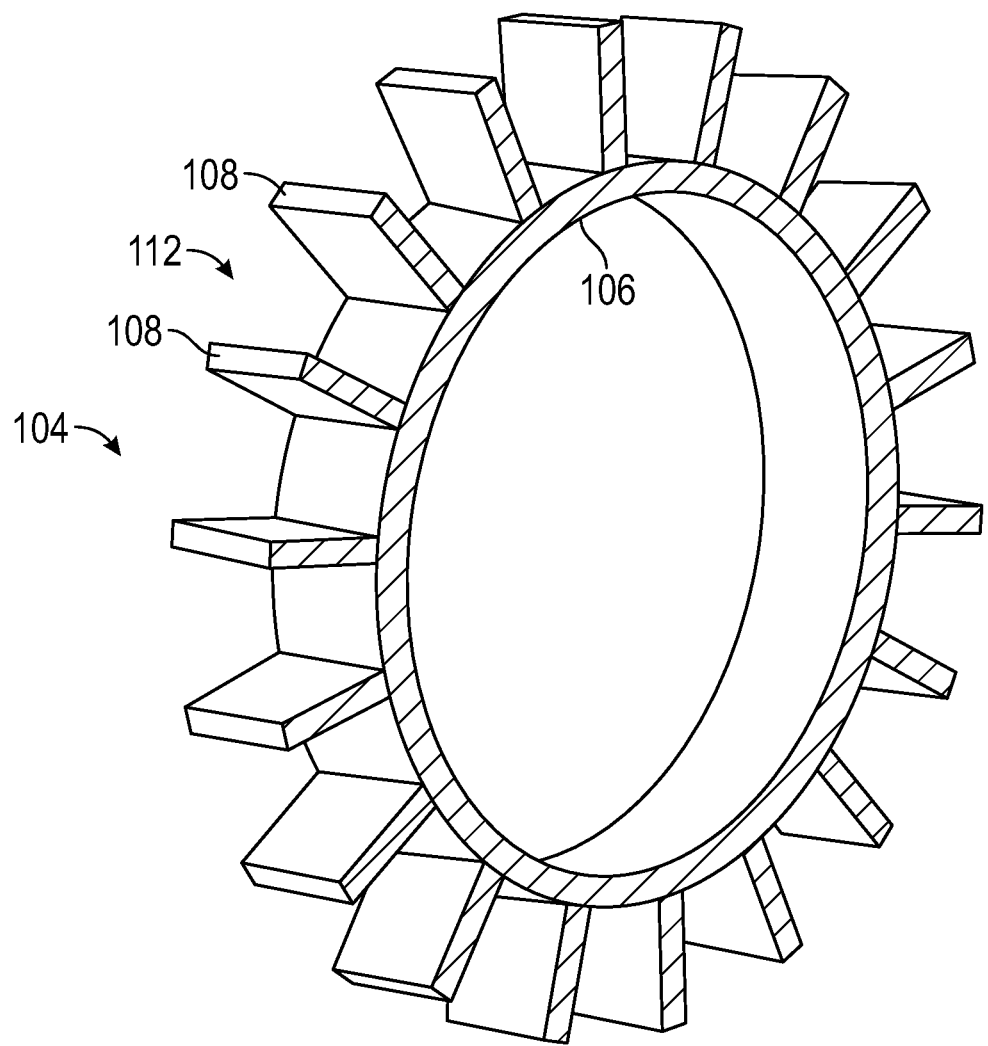
FIG. 2 is a perspective view of an embodiment of a stator for an electric machine.

In more detail, FIGS. 1 and 2 which, respectively, illustrates a cross-sectional view of the electric motor 100 and a perspective view of a simplified stator core 104. The electric motor 100 includes a stator 102 configured to surround but not rotate with a rotor shaft 142.

The stator 102 include a stator core 104 and one or more stator windings 110 supported or otherwise carried by the core 104. The windings can be formed as individual potted Litz wire windings in one embodiment. The stator core 104 includes ring hub 106 and a plurality of teeth 108 that extend outwardly from the ring hub 106. The adjacent teeth 108 form a stator slot 112 into which one or more stator windings may be disposed. That is, each slot can have a single stator winding 110 disposed therein or it can include two or more windings as shown in further examples below.

The motor 100 also includes a rotor 140. The rotor shown in FIG. 1 includes a rotor shaft 142 that rotates about a rotation axis 144. The rotor 140 also includes a magnet carrying structure 146 connected to the shaft 142. The structure 146 carries one or more permanent magnets 148.

As shown, the stator 102 (and the windings 110 carried by the stator 102) is located radially inboard of the rotor magnets 148 relative to the rotation axis 144, with a radial air gap 150 located between the rotor 140 and the stator 104. As illustrated, the rotor 140 is mounted on a shaft 110 by the structure 146. When in a "motor" mode where current is applied into the windings 110 that current will interact with the magnets 148 and cause the magnets/structure to rotate so as cause rotation of the rotor shaft 142 about axis 144 so that the shaft 142 can provide motive force to a load. Alternatively, in a "generator" mode, the shaft 142 can be driven such that interaction of the magnets cause a current to flow in the windings 110 to drive an electrical load.

The stator core 104 can be formed from a plurality of axially stacked laminations, which are stacked along the rotation axis 144. In some embodiments, the laminations 116 are formed from a steel material, but one skilled in the art will readily appreciate that other materials may be utilized. In an alternative embodiment, the stator 104 can be formed as individual stator sections as is known in the art.

The stator windings 110, as shown, include core segments 110a extending through the stator core 104 and end turn segments 110b extending from each axial stator end of the stator core 104. As discussed above, when the stator windings 110 are energized via an electrical current therethrough, the resulting field drives rotation of the rotor 140 about the rotation axis 144.

Electric motors, as shown in FIGS. 1-2, may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

Herein, channels in various parts of the stator assembly are disclosed as well as a header that delivers coolant into those channels. In one embodiment, the channel is formed between the core and windings on an inner diameter of the windings. In another, the channels are formed in separators (discussed below) that are disposed between the outer diameters of the windings. Of course, embodiments may also cover situations where channels are formed in both the separators and between the stator and the windings.

Figure 3:
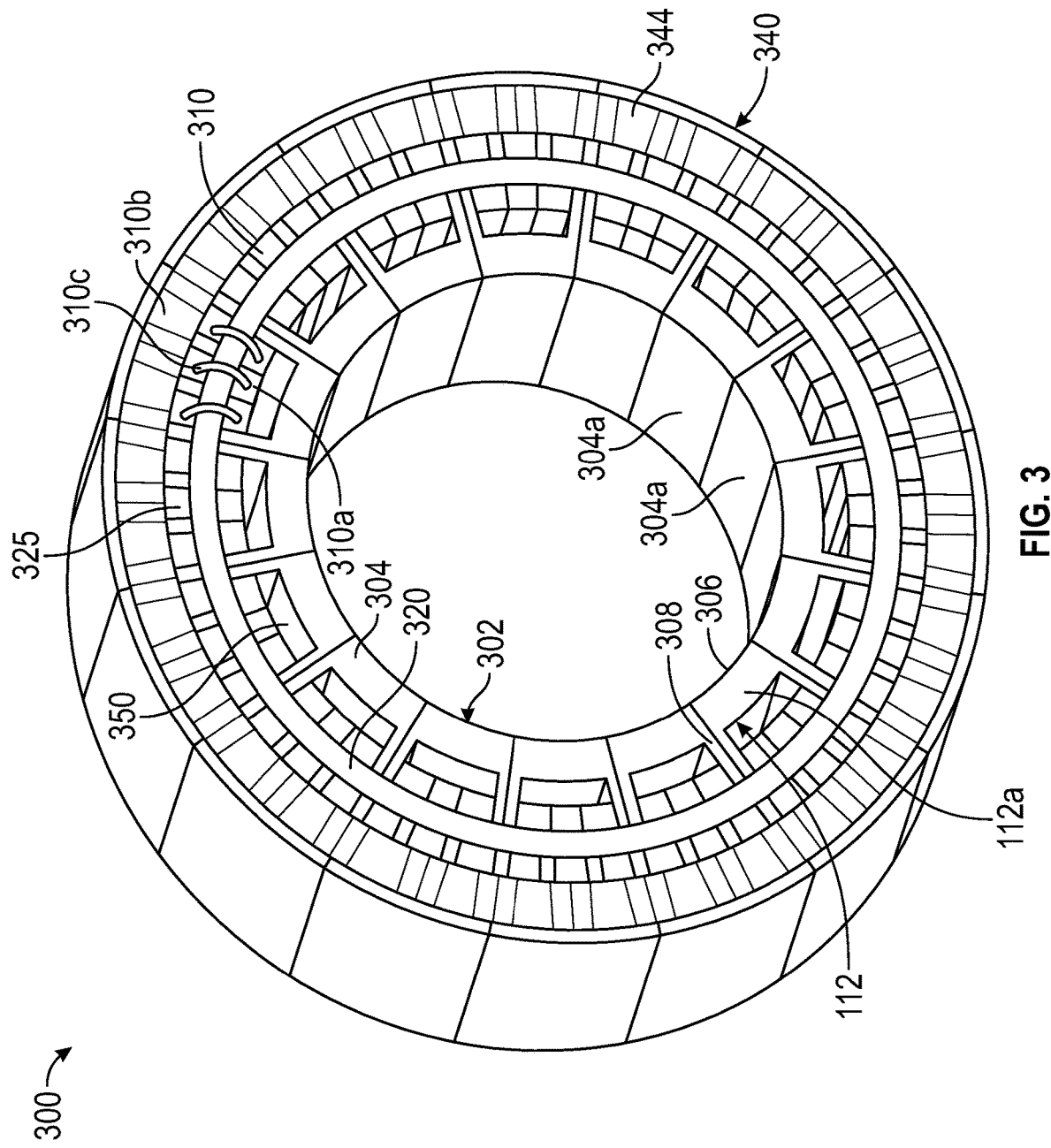
FIG. 3 shows a perspective of a portion of a motor according to one embodiment.

FIG. 3 shows a perspective view of a stator/rotor combination. The combination shown in FIG. 3 is applicable to all embodiments and can be arranged proximate headers to provide coolant into and out of it.

For brevity, the combination shown in FIG. 3 will be referred to motor 300. The motor 1000 includes a stator 302. The stator is formed of a stator core 304 and one or more stator windings 310 supported or otherwise carried by the core 304. As illustrated, the core 304 is formed of separate stator segments 304a that, when combined formed ring hub 306. The hub 306 includes a plurality of teeth 308 that extend outwardly from the ring hub 306.

Figure 4:
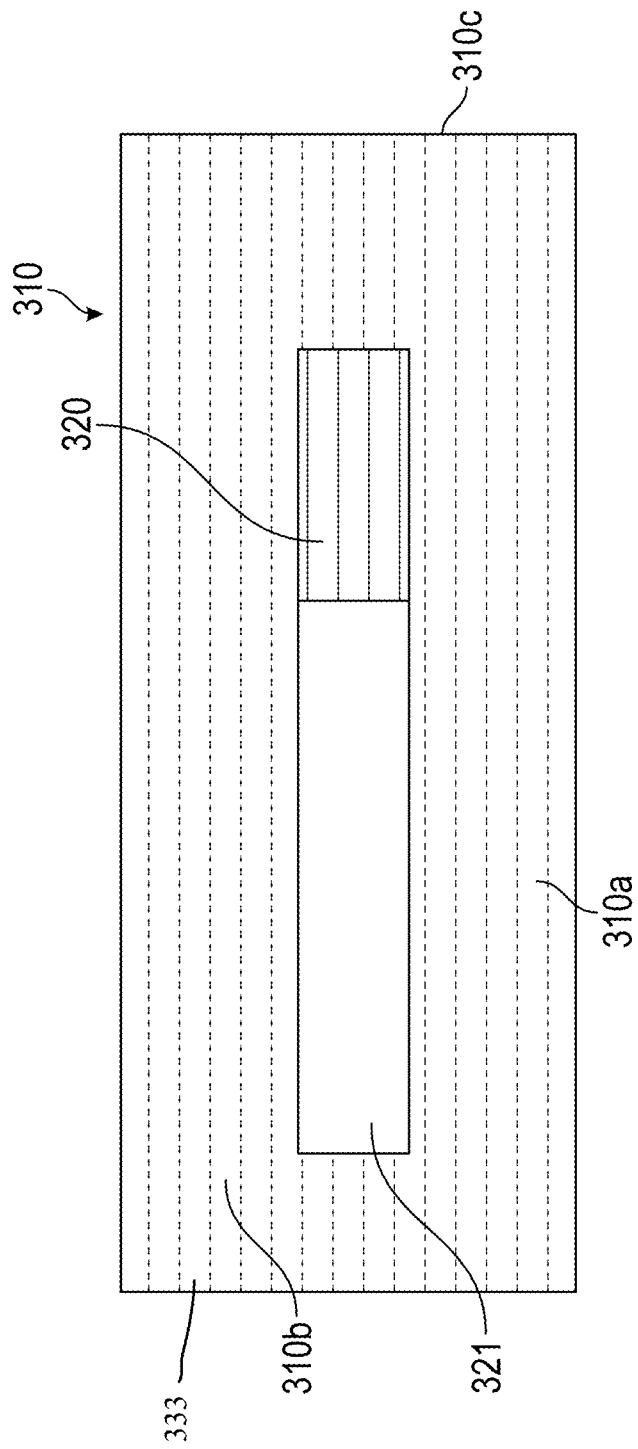
FIG. 4 shows a side-view of an example winding arranged to surround a back iron of the stator.

The motor 300 includes a plurality of windings 310. The windings 310 can include "inner" windings 310a and "outer" windings 310b that are joined by end turns 310c around a stator back iron 320 in one embodiment. Of course, other configurations can be possible. In one embodiment, the windings can be formed as individual potted Litz wire windings. The windings 310 can be formed as individual windings that form a loop as shown in FIG. 4 in one embodiment. The potting material is by reference number 333 and the multiple strands in FIG. 3 indicate that windings 310 contain wires that can be Litz wires.

FIG. 4 shows a side view of a winding 310 arranged such that surrounds the back iron 320. The end turn 310c goes around the back iron. The wires that form the winding 310 can be arranged so that they form discreet loop shaped units and a segmented back iron can be provide to thread into the inner portion 321 of the loops. Or course, distributed windings could also be utilized with the teachings herein.

Referring again to FIG. 3, the motor 300 also includes a rotor 340. While not shown, it is understood that the rotor shown in FIG. 3 includes a rotor shaft that rotates about a rotation axis. The rotor 340 carries one or more permanent magnets 344. The motor 300 works as described above.

As configured, the stator core 304 includes the ring hub 306 and a plurality of teeth 308 that extend outwardly from the ring hub 306. The adjacent teeth 308 form a stator slot 112 into which one or more stator windings may be disposed. That is, each slot can have a single stator winding 310 disposed therein or it can include two or more windings as shown in FIG. 3 and further examples below.

Figure 5:
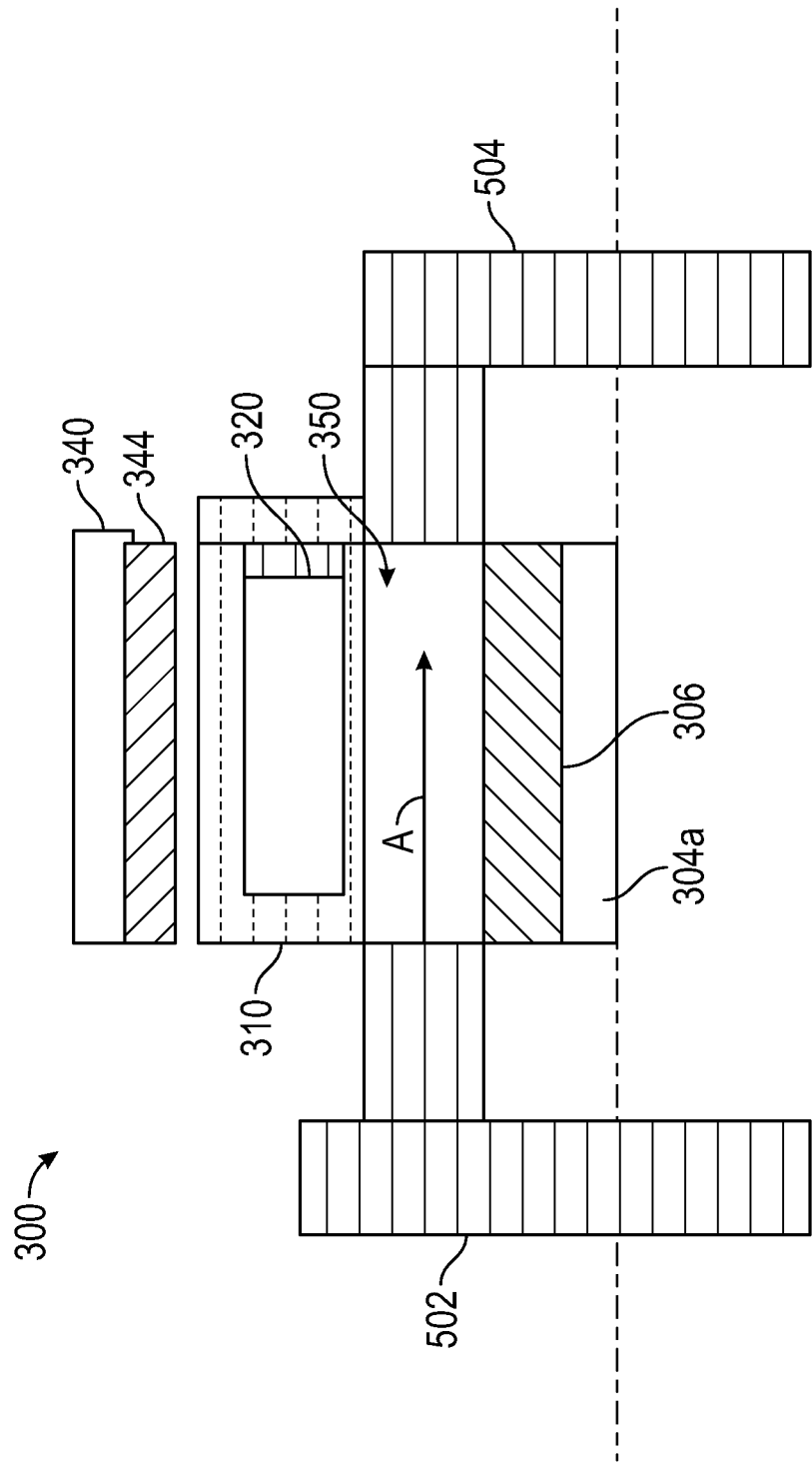
FIG. 5 shows parts of motor arranged relative to a header that delivers coolant to and from the motor though the channel and/or through channel in separators between the windings.

The windings 310 can be arranged such that a cooling channel 350 is formed between an ID of the windings and a base 112a of the slot 112 that where the windings reside. In one embodiment, the cooling channel 350 is provided a cooling flow from one or more headers as illustrated in FIG. 5. It shall be understood that the back iron 320 can help to maintain the windings 310 a desired distance from the base 112a to establish the channel 350.

FIG. 5 illustrates a simple cross section through one segment 304a of the motor 300 to illustrate how fluid can be passed though the channel 350. As illustrated a coolant delivery system that includes an inlet header 502 and an outlet header 504 is arranged relative to the segment 304a so that it can provide fluid into the channel 350 and remove it from the channel. The fluid passes, in this example, in the direction indicated by arrow A. Such a configuration can result in flow continuity and reduced pressure drop.

As illustrated in FIG. 3, each outer winding 310b is separated from each other by phase separators 325 (separators for short herein). These separators can be any separator as described herein. An insulator 330 is disposed between each of the inner windings 310a.

The phase separators 325 can be formed of electric insulators such as polymers (nomex, kapton etc) or ceramics such as Al2O3 or AlN. Alternatively, the separators can be formed of highly thermal conductors such as copper/aluminum (not conducting electricity by offering high thermal conductivity to extract heat). The configuration of the insulators separators and windings is better viewed in FIG. 6.

Figure 6:
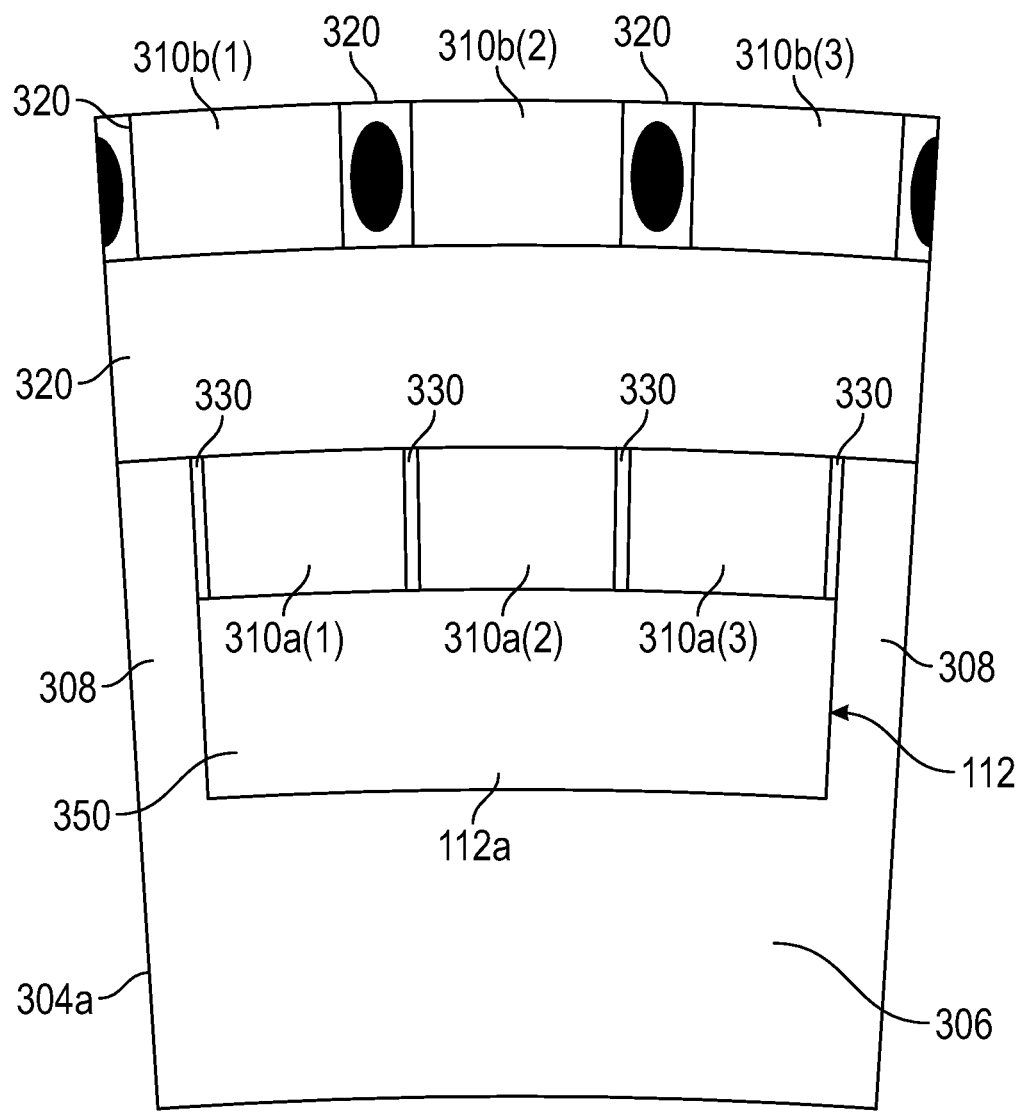
FIG. 6 shows a detailed view of three windings disposed in a stator slot and how those windings form the cooling channel as well as separators that can be placed between the windings.

FIG. 6 shows an end view of one segment 304a without illustrating the end turns 310c in detail for clarity. As illustrated, the segment includes teeth 308 that define a stator slot 112. The slot 112 is partially filled with three windings that include three ID windings 310a(1), 310a(2), 310a(3) and three outer windings 310b(1), 310b(2), 310b(3). As shown as being discrete in FIG. 6, it shall be understood that each inner winding 310a can be electrically joined to a corresponding outer winding 310b and this correspondence is indicated by the numbers in parenthesis following the winding number.

While shown as being a three-phase motor in the examples, it should be noted that any multi-phase (3-phases, 5 phases and 3*n phases) can be implemented according to the teachings herein. For example, in the case of a 5-phase motor, there would be five ID windings 310a(1)-310a(5) and five outer windings 310b(1)-310b (5).

The inner and outer windings 310a/310b are on opposite sides of the back iron 320. The back iron 320 or other elements are arranged such that the inner windings 310a are separated from the base 112a of the slot 112 to define the channel 350

The coolant flows through the flow channel 350 directly cools one half of the winding (e.g., inner windings 310a) in the slot 112. The heat generated by the outer winding portion 310b gets effective conducted to the inner windings 310a winding due to very high thermal conductivity as the inner windings are cooled by the passing coolant liquid. Of course, after the coolant passes through, it can be cooled at an external location and recirculated back into the stator.

As shown, each outer winding 310b is separated from its adjacent neighbor by a separator 325. Optionally, each separator 325 can include a flow channel as indicated by the dot therein. Thus, based on FIG. 6 the skilled artisan will realize at least 2 configurations: 1) a configuration where the separators 325 include a flow channel and the flow channel 350 is present and 2) a configuration where the separators 325 do not include a flow channel and flow channel 350 is present. Further, the skilled artisan will realize that the flow channels can be connected to any of the headers disclosed above so that coolant can be provided to them. Additional headers can be provided for the separators or the separators 325 can be attached to the same header that delivers fluid to the channel 320.

Figure 7:
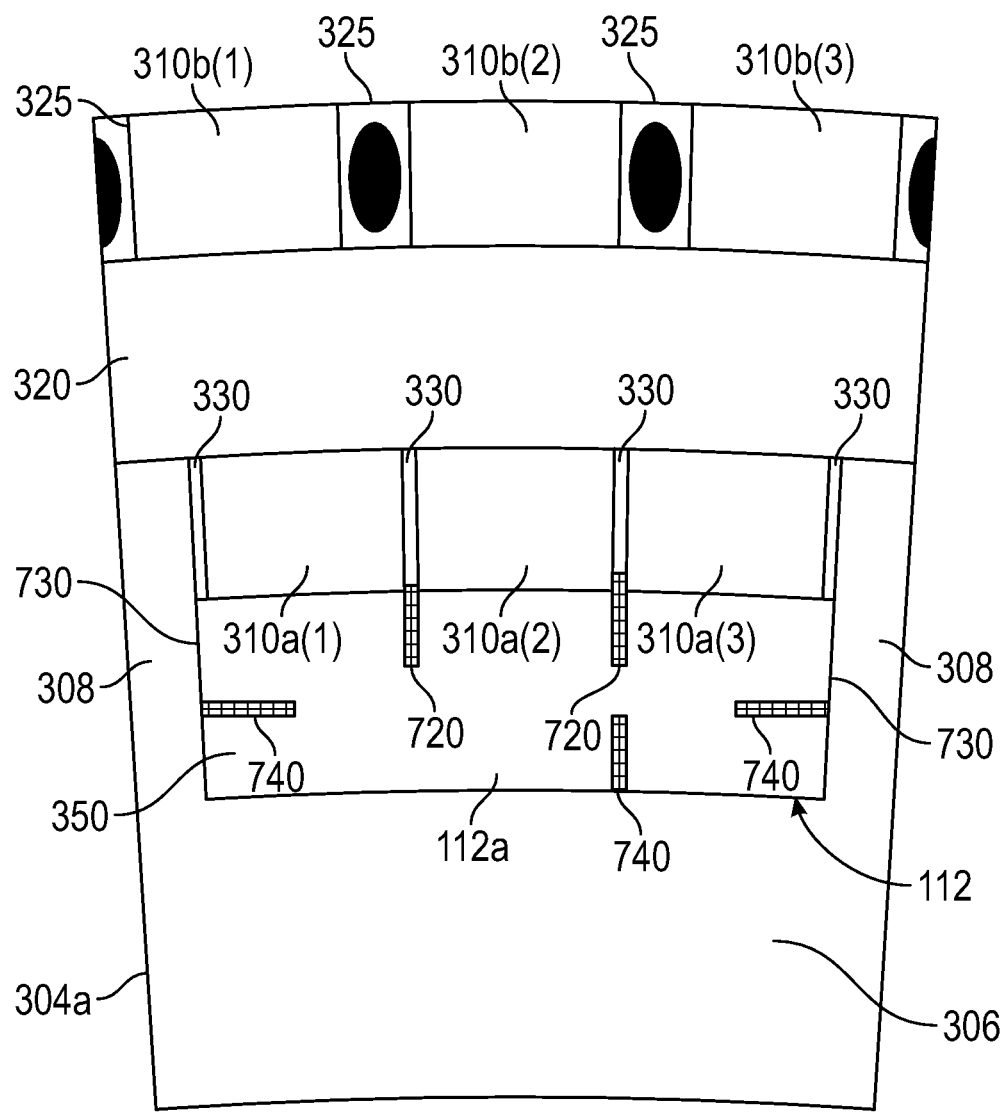
FIG. 7 shows a detailed view of three windings disposed in a stator slot similar to FIG. 6 but also showing optional fins that can enhance cooling.

Further, in FIG. 6, optional insulators 330 can be provided between adjacent inner windings 310a and between the inner windings 310a and the teeth 308. As shown in FIG. 6, those insulators are level or flush with the inner diameter of the ID windings 310a. In one embodiment, as shown in FIG. 7, the insulators can include fins or pins 720 that extend into the stator slot 350. These fins/pins 720 can enhance heat transfer capacity of the insulators 330 as there is more contact with the coolant in the flow channel 350. As also shown in FIG. 7, an inner wall 730 of the tooth 308 or the base 112 of the cooling channel can include fins 740 to increase heat transfer as well. It should be noted that the fins 720/740 are both optional so configurations without any fins, with both fins 720/740 or with only one of fins 720/740 are contemplated.

Figure 8:
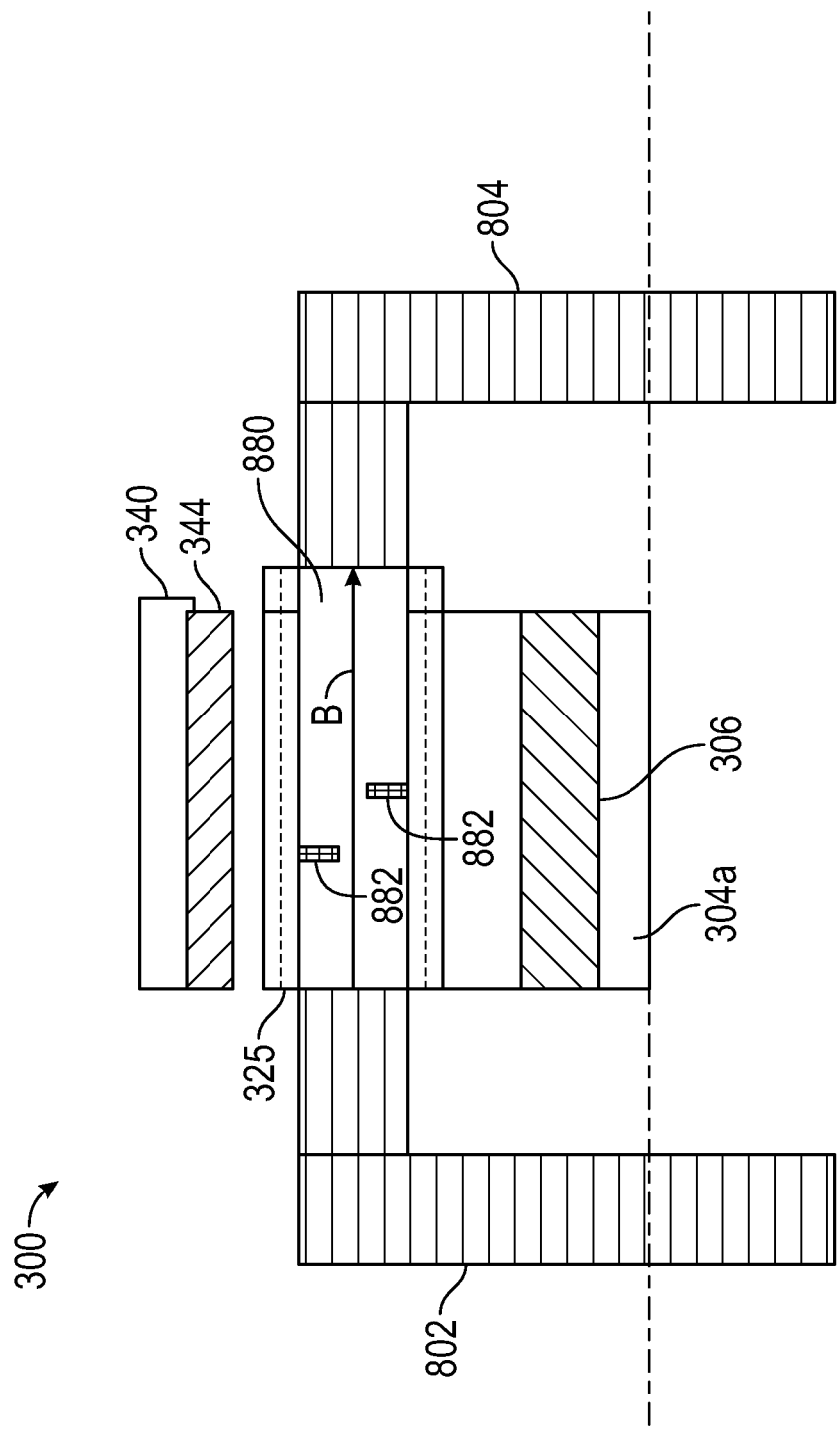
FIG. 8 shows one configuration of inlet and outlet headers for providing fluid to cooling channel in the separators.

In the prior examples illustrated above it was assumed that the flow through the flow channels has been uni-directional in a manner the same or similar or to that shown in FIG. 5. To that end, the headers 502/504 could provide for fluid through the separators 325. Alternatively, the separators could have their own inlet and outlet headers 802, 804 for uni-directional flow as shown in FIG. 8. In particular, FIG. 8 illustrates a simple cross section through one segment 304a of the motor 300 to illustrate how fluid can be passed though the separators 325. In FIG. 8, the coolant channel through the separator 325 is identified by reference numeral 880. As illustrated a coolant delivery system that includes an inlet header 802 and an outlet header 804 is arranged relative to the segment 304a so that it can provide fluid into the separator coolant channel 880 and remove it from the channel. The fluid passes, in this example, in the direction indicated by arrow B. Such a configuration can result in flow continuity and reduced pressure drop.

Figure 9:
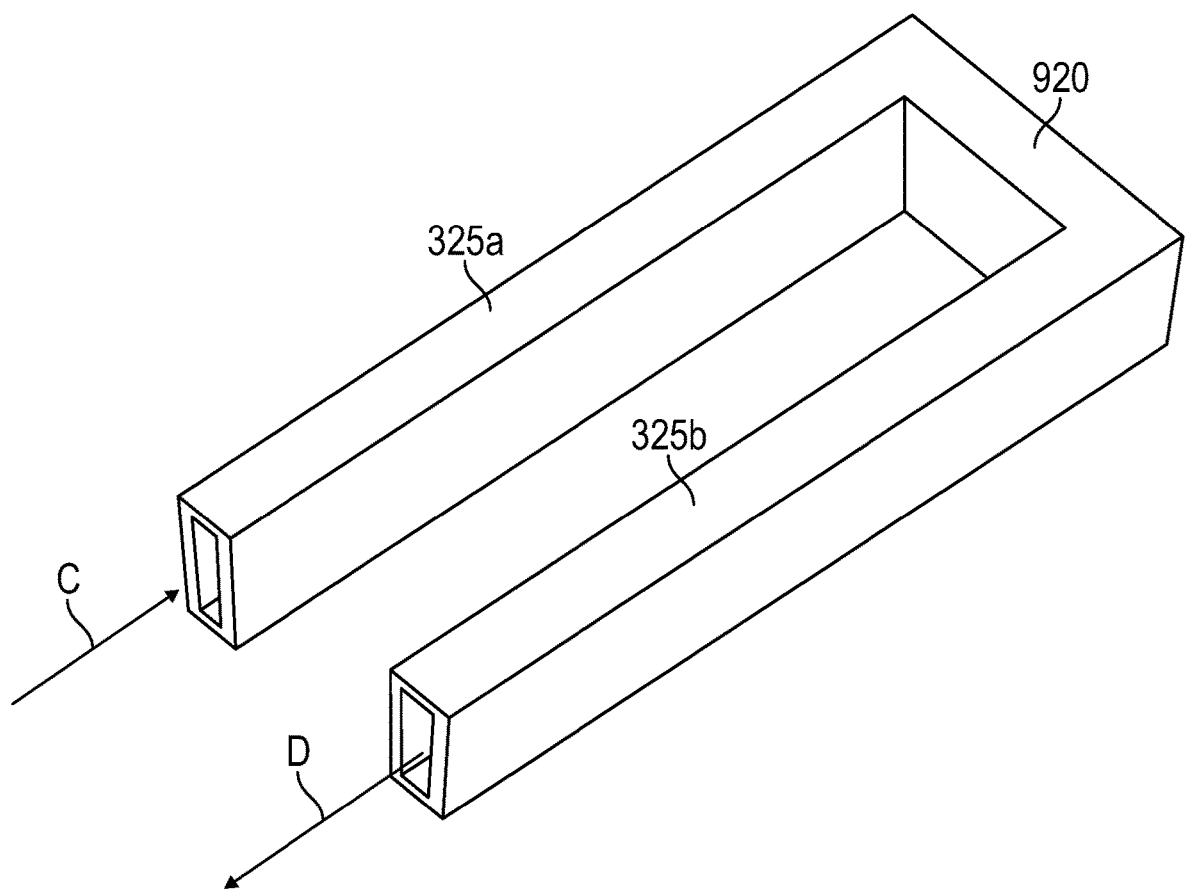
FIG. 9 shows serially connected separators.

Optionally, in this or any other embodiment, the separator coolant channel 880 can have optional fins/pins 882 therein to increase heat transfer. Further, in one embodiment, the separators could be shaped as shown in FIG. 9. In such a case, fluid with make a complete "loop" through the separator allowing for the outlet header 804 to be eliminated, integrated into inlet heater 802 or placed on the same side as the inlet header 802.

As shown in FIG. 9, two separators 325a, 325b are serially connected by a connector or manifold 920. In such a case, the coolant flows in one separator 325 a in a first direction (e.g., direction C), through the manifold 920 and out the second separator 325 b in a second direction D). In one embodiment and as illustrated, the first and second directions C/D are opposite of another.

Of course, the combination of the two separators 325a, 325b and the manifold 920 could be one element and could be formed in manner disclosed herein including additive manufacturing. In one embodiment, the winding separators 325 and manifold 920 are made up of ceramic and are cast with a through hole passing through the entire length of them.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A stator comprising:
   a stator hub;
   a plurality of stator teeth extending from the stator hub that define a stator slot having a stator slot base;
   a plurality of windings disposed in the stator slot, each winding having an inner winding portion and an outer winding portion connected to the inner winding portion by end turns; and
   a back iron;
   wherein the plurality of windings surrounds the back iron and is held apart from the stator slot base so that a fluid channel is defined between the inner winding portion of the plurality of windinqs so fluid can be passed between the stator slot base and the inner winding portion to cool the inner winding portion; and
   one or more winding separators formed of insulating material and disposed between adjacent ones of the outer winding portions, wherein the one or more winding separators include cooling passages formed therein.

2. The stator of claim 1, wherein the winding is encased in a potting material.

3. The stator of claim 2, wherein the winding is formed of Litz wire.

4. The stator of claim 1, wherein the one or more winding separators include fins formed in the cooling passages thereof.

5. The stator of claim 1, further comprising insulators disposed between adjacent inner winding portions.

6. The stator of claim 5, wherein the insulators include fins that extend into the fluid channel.

7. The stator of claim 1, wherein the plurality of windings includes 3, 5 or 3n windings where n is a whole number.

8. The stator of claim 1, wherein the stator slot includes walls and one or more fins extending from the tooth or the base into the fluid channel.

9. The stator of claim 1, in combination with an inlet header and an outlet header that collectively provide fluid through the fluid channel.

10. A method of cooling the stator as recited in claim 1, the method comprising:
    providing a fluid into the fluid channel from an inlet header;
    removing the fluid from the fluid channel via an outlet header; and
    providing a fluid into the cooling passages in the winding separators and removing the fluid from the cooling passages in the winding separators by separator cooling inlet and outlet headers.

11. The stator of claim 10, wherein the separator cooling inlet and outlet are integrated with the inlet and headers.

12. The method of claim 10,
    wherein the one or more winding separators includes a first winding separator and a second winding separator connected to one another by a manifold so that fluid entering the first winding separator is directed through the first winding separator in a first direction, through the manifold and into and through the second winding separator in a second direction.

13. The method of claim 12, wherein the first and second directions are opposite of another.

* * * * *